United States Patent [19]
Vitus et al.

[11] Patent Number: 4,553,578
[45] Date of Patent: * Nov. 19, 1985

[54] STAR-SHAPED POLYMERS FOR IMPROVED TIRE TREADS

[75] Inventors: Francis J. Vitus; Ivan G. Hargis; Russell A. Livigni; Sundar L. Aggarwal, Summit County, all of Ohio

[73] Assignee: GenCorp Inc., Akron, Ohio

[*] Notice: The portion of the term of this patent subsequent to Oct. 11, 2000 has been disclaimed.

[21] Appl. No.: 696,555

[22] Filed: Jan. 30, 1985

Related U.S. Application Data

[60] Continuation-in-part of Ser. No. 421,699, Sep. 22, 1982, Pat. No. 4,497,748, which is a division of Ser. No. 282,671, Jul. 13, 1981, Pat. No. 4,409,368.

[51] Int. Cl.$^4$ .................. B60C 11/00; C08L 67/06; C08F 227/04
[52] U.S. Cl. .................. 152/209 R; 428/492; 428/521; 525/64; 525/92; 525/314; 525/901; 526/335; 526/340
[58] Field of Search .............. 152/109 R; 525/250, 525/314, 92; 526/173, 335, 340

[56] References Cited

U.S. PATENT DOCUMENTS

| | | | |
|---|---|---|---|
| 3,644,322 | 2/1972 | Farrar | 526/173 |
| 3,652,516 | 3/1972 | Farrar | 526/173 |
| 3,734,972 | 5/1973 | Naylor | 260/665 R |
| 3,734,973 | 5/1973 | Farrar | 526/173 |
| 3,763,126 | 10/1973 | Farrar | 526/173 |
| 3,903,168 | 9/1975 | Foss | 26/583 R |
| 3,985,830 | 10/1976 | Fetters | 525/314 |
| 4,116,917 | 9/1978 | Eckert | 526/335 |
| 4,397,994 | 8/1983 | Takeuchi et al. | 526/332.3 |
| 4,417,027 | 11/1983 | Kan et al. | 525/99 |

FOREIGN PATENT DOCUMENTS

| | | |
|---|---|---|
| 1034133 | 7/1978 | Canada. |
| 2427955 | 8/1976 | Fed. Rep. of Germany. |

*Primary Examiner*—Michael Ball

[57] ABSTRACT

A tire having a tread exhibiting substantial low rolling resistance, traction and wear comprises a cured compounded carbon black reinforced blend of (A) a star-shaped substantially random vinyl containing rubbery solution polymerized polymer selected from the group consisting of polybutadienes, polyisoprenes, butadiene-styrene copolymers, butadiene-isoprene copolymers, isoprene-styrene copolymers, butadiene-isoprene-styrene copolymers and mixtures of the same and (B) at least one other rubbery diene polymer.

6 Claims, 1 Drawing Figure

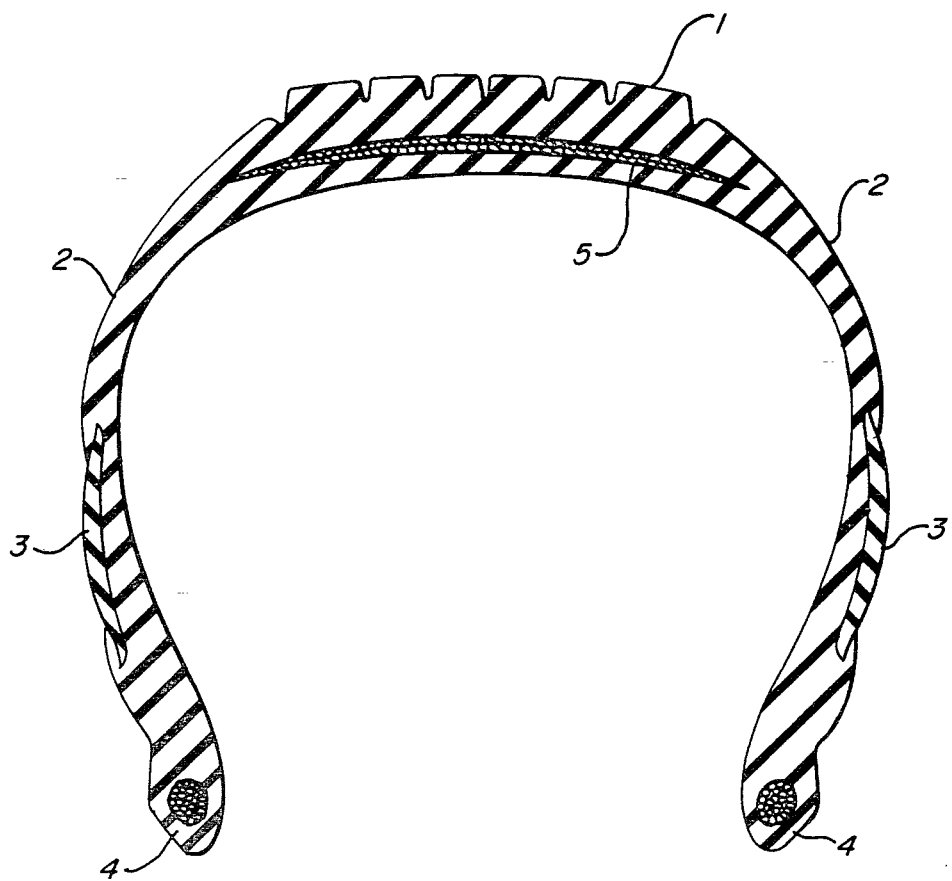

STAR-SHAPED POLYMERS FOR IMPROVED TIRE TREADS

This application is a continuation-in-part of prior U.S. patent application Ser. No. 421,699, filed Sept. 22, 1982 now U.S. Pat. No. 4,497,748, granted Feb. 5, 1985 which is a division of U.S. patent application Ser. No. 282,671, filed July 13, 1981 now U.S. Pat. No. 4,409,368, granted Oct. 11, 1983.

This invention relates to the use of rubbery star-shaped diene based polymers and copolymers and mixtures thereof in tire tread compositions.

An object of this invention is to provide a tire having a tread of a composition containing a rubbery star-shaped diene or diene based polymer or mixture of the same.

Another object of this invention is to provide a vulcanizable composition useful in making a tire tread.

A further object of this invention is to provide a vulcanized composition useful in retreading.

These and other objects and advantages of the present invention will become more apparent to those skilled in the art from the following detailed description, examples and drawing.

SUMMARY OF THE INVENTION

This invention covers novel solution polymerized rubbery diene or diene based substantially random polymer(s) selected from the group consisting of polybutadiene, polyisoprene, butadiene-styrene copolymers, butadiene-isoprene copolymers, isoprene-styrene copolymers, butadiene-isoprene-styrene copolymers and mixtures of the same having an $\overline{M}n$ of from about 100,000 to 500,000, having a medium to high vinyl (1,2 or 1,2+3,4) content and having a star-shaped or star-type structure (having an average of from about 4 to 9 arms) for use in tire tread compounds having excellent processability, rolling efficiency, traction and wear performance. The initiator for preparing this copolymer consists of a soluble multifunctional organolithium compound prepared using a coordinating agent such as triethylamine as described in U.S. patent application Ser. No. 421,699, filed Sept. 22, 1982, the disclosure of which is incorporated herein and made a part hereof by reference to the same. The use of a polyfunctional initiator to form a star-shaped polymer eliminates the need to post-react with a chain extension agent involving another reaction step.

For example, the solution polymers such as the solution SBR's disclosed herein are fundamentally different from those reported by Shell/Dunlop (GB No. 2071117A), Phillips Petroleum Company (U.S. Pat. No. 3,393,182), Bridgestone Tire Co. (EP Application No. 48619), Asahi Kasei Kogyo Co. (JA Application 57-53511) and Japan Synthetic Rubber Co. (U.S. Pat. No. 4,397,994), which disclose the formation of star-shaped polymers by a post-polymerization end-linking reaction, e.g., a second step during polymer formation. End-linking is accomplished by reacting the active polymer lithium chain ends with compounds of functionality of two or greater, such as divinylbenzene, diesters, organic halides and metal halides.

It has been reported (C. R. Wilder, J. R. Haws and T. C. Middlebrook, "Kautschuk und Gummi Kunststoffe," 37(8), 683 (1984)) that tread compounds containing SBR copolymers such as "Solprene" 1204 offer the "best (lowest) rolling resistance" of the commercial polymers. C. A. Uraneck and J. N. Short, "Journal Of Applied Polymer Science," Vol. 14, pages 1421-1432 (1970) earlier noted the breakdown of polymers having carbon-tin bonds, illustrated by "Solprene" 1204, on mill mixing with stearic acid. R. S. Hanmer and H. E. Railsback, "Rubber Age," Vol. 96, October, 1964, pages 73-77, disclose a carcass compound of 70/30 NR/1204 (natural rubber/"Solprene" 1204). Hsieh, "Rubber And Plastics Age," Vol. 46, April, 1965, pages 394-401, shows a heavy duty truck tire tread of 30-50 "Solprene" 1204 and 70-50 natural rubber. Kan et al, U.S. Pat. No. 4,417,027 discloses a composition for a tire sidewall of 10-100 star shaped SBR having preferably less than 20% styrene and 80-0 of another diene rubber, but the nature of the star SBR is not disclosed.

The present invention involves the prior formation of a stable soluble polyfunctional initiator which is subsequently used to polymerize or copolymerize dienes or dienes with styrene based on conventional anionic solution polymerization technology.

There is a significant difference in the chemical stability of the Sn-coupled solution polymers disclosed in the above references and the solution SBRs disclosed in this application. Star-shaped polymers prepared by chain extension with tin halides are highly susceptible to molecular weight breakdown in the presence of acids (J. Applied Polymer Sci., 14, 1421 (1970)), relative to the star-shaped polymers having carbon-carbon branches. The branching sites of the star-shaped polymers of this invention have only stable carbon-carbon bonds.

DISCUSSION OF DETAILS AND PREFERRED EMBODIMENTS

The vinyl containing solution polymers disclosed here are prepared with the polyfunctional initiators formed by the reaction of secondary-butyllithium (s-BuLi) with divinylbenzene (DVB) in mixtures of non-polar solvents and triethylamine (TEA), as fully described in U.S. patent application Ser. No. 421,699, supra. The commercial divinylbenzene used contains ethylvinylbenzene (EVB) which reacts as a comonomer and is incorporated into the initiator. The reaction stoichiometry is based solely upon DVB and s-BuLi, since ethylvinylbenzene is monofunctional and cannot lead to a change in carbon-lithium functionality. The polar solubilizing agent (triethylamine) must be present to obtain a soluble initiator. If a polar solvent is not present, a gelatinous precipitate forms prior to complete addition of divinylbenzene. At the ratio RLi/DVB=6/5 in benzene or toluene containing triethylamine, a soluble star-type polyfunctional initiator is obtained. Initiators have been prepared at temperatures between $-20°$ C. and $+22°$ C. The initiators are stable when stored at $+5°$ C. under inert atmosphere (argon), showing neither appreciable loss of carbon-lithium activity nor formation of any insoluble phase over several months duration.

The measured lithium functionality of the initiator is calculated from the ratio of its number-average molecular weight (from vapor phase osmometry) to equivalent-average molecular weight (from radiochemical assay of tritiated s-BuLi/DVB adduct). Assuming no termination of initiator and polymer, the number-average of star polymeric arms is taken to be equal to the measured carbon-lithium functionality of the initiator.

Thus, the initiator used to make the star rubbery vinyl containing diene or diene based polymers of this invention is a hydrocarbon soluble, gel free and stable initiator for anionic polymerization comprising the adduct of RLi where R is selected from the group consisting normal, secondary and tertiary alkyl and cycloalkyl radicals of from 2 to 20 carbon atoms and mixtures thereof, and a diethylenically unsaturated aromatic compound selected from the group consisting of divinyl benzene and diisopropenyl benzene and mixtures thereof, the mole ratio of RLi to said aromatic compound being about 1:0.83, said adduct having an average of from about 4 to 9 C-Li sites and a VPO $\overline{M}n$ of from about 750 to 4,000.

A randomizer if used to increase the vinyl content of the diene based polymers and copolymers of this invention is a polar modifier such as tetrahydrofuran, diethylether, triethyl amine, 1,2-diazabicyclo (2,2,2)octane or triethylene diamine (DABCO), hexamethylphosphorictriamide (HMPA), anisole and diphenyl ether. It is preferred that the polar modifier be a strong Lewis base selected from the group consisting of tertiary aliphatic amines and aliphatic ethers. Examples of strong Lewis bases are triglyme (triethylene glycol dimethyl ether), tetraglyme, diglyme (diethylene glycol dimethyl ether), N,N,N',N'-tetramethylethylene diamine, dimethoxyethane and 1,2-dipiperidino ethane. These compounds are used in minor amounts by weight based on the weight of the monomers sufficient to effect randomness and to increase the vinyl groups. In general they are used in an amount of from about 0.01 to 20% by weight based on the weight of the diene or diene and styrene monomers in the polymerization mixture. This amount can be adjusted to take into account the amount of tertiary amine used in the preparation of the initiator which is not separated from the tertiary amine-hydrocarbon mixture used for preparation of the initiator.

Vinyl content of the diene segments and styrene (if used) sequence distribution are controlled by polymerization temperature and the mole ratio of triethylamine/RLi (or additional modifier if used). The number of polymer branches formed per molecule of initiator is governed by the number of lithium atoms per initiator molecule. The expected functionality of the initiator is calculated from $R/(R-1)$ where R is the mole ratio of S-BuLi/DVB, and S-BuLi is used in excess relative to DVB.

Solvents for use during solution copolymerization are aliphatic hydrocarbons like hexane, heptane, octane, nonane, decane, undecane, cyclohexane, cycloheptane, cyclooctane and the like and mixtures thereof. Cyclohexane is a preferred solvent to use. In solvent polymerization it is preferred to operate on a basis of not over about 15 to 20% polymer solids concentration in the solvent to enable ready heat transfer, to facilitate stirring and to aid in processing. Temperatures during polymerization typically are from about 25° to 60° C. Polymerization times will depend on the desired degree of conversion to copolymer but in general will be from about 1 to 6 hours.

Polymerization, of course, should be conducted in a closed reactor, fitted with a stirrer, heating and cooling means, with means to flush with or pump in an inert gas such as nitrogen, neon, argon and so forth in order to polymerize under inert or non-reactive conditions, with means to charge monomers, solvent, initiator and randomizers, venting means and with means to recover the resulting copolymer and so forth. After the copolymer has been prepared, a suitable antioxidant such as 2,6-di-tert-butyl-p-cresol or other antioxidant may be added to the same. The antioxidant may be added to the polymeric solution or the polymer after it has been recovered.

After polymerization, alcohol or water is added to the solution to precipitate the polymer and to protonate the polymer, e.g., to remove the Li atoms and to terminate the polymerization. The solvent is stripped off and the polymer dried. Alternatively the solution can be sprayed into water.

The dried star polymer can then be mixed with the other rubbers in a Banbury or on a rubber mill with the carbon black, oil and other curing and compounding agents. Thus, the blends of the present invention can be compounded and cured in the same manner as other rubbery polymers. For example, they can be mixed with sulfur or sulfur donor materials, peroxides, reinforcing carbon blacks, $SiO_2$, $TiO_2$, $Sb_2O_3$, stearic acid, ZnO, zinc stearate, red iron oxide, other rubber fillers and pigments, N-tert-butyl-2-benzothiazole sulfenamide or N-cyclohexyl-2-benzothiazole sulfenamide, tetramethyl or ethyl thiuram disulfide, benzothiazole disulfide, antioxidants (like (N-(1,3-dimethylbutyl)-N'-phenyl-p-phenylenediamine) and rubber extending or processing mineral or petroleum oils and the like. Stabilizers, UV light absorbers and other antidegradants can be added to these polymers.

The polydiene or styrene-diene copolymer rubber, or mixture thereof, composition of this invention comprises the vinyl containing polymers selected from the group consisting of polybutadienes, polyisoprenes, butadiene-styrene copolymers (preferred), butadiene-isoprene copolymers, isoprene-styrene copolymers, butadiene-isoprene-styrene copolymers and mixtures of the same, obtained by polymerizing or copolymerizing at least one of butadiene-1,3 and isoprene (2-methyl-butadiene-1,3) and optionally styrene with the multilithiated initiator, containing up to about 30 wt. %, preferably from about 10 to 25 wt. % of styrene and from about 12 to 60% by weight of vinyl segments or placements (segments or moieties). When used in blends with diene rubbers, such as for example natural rubber (preferred), synthetic cis-1,4 polyisoprene, cis-1,4 polybutadiene, high trans butadiene polymers and mixtures of the same, it provides for excellent processability and a combination of rolling efficiency traction and wear resistance (as measured by laboratory instruments) equivalent to blends of NR with Sn-coupled solution SBR's.

Tires are built in the customary fashion in which the vulcanizable star-shaped polymeric containing tread composition of this invention is applied to a tire green carcass and cured or vulcanized in a mold. The vulcanizable star-shaped polymeric tread composition can be extruded or otherwise formed and vulcanized (precured). The pre-cured tread stock can then be applied to a cured, cleaned and adhesive coated cured tire carcass and cured to the same (as in re-treading). The tread composition of the present invention can be used in making bias, belted bias and radial passenger tires as well as used in making truck and off-the-road tires.

PREPARATION OF RUBBERS: EXPERIMENTAL AND POLYMERIZATION PROCEDURES

The polymerizations described in this disclosure were carried out in an argon atmosphere in capped glass bottles fitted with a rubber gasket inner liner. Solvents were purified by passing the liquid through columns of 5 Å molecular sieves. Butadiene-1,3 (99 mol %) was purchased from Phillips Petroleum Company. Purification was accomplished by passing the material through columns of 3 Å molecular sieves. Styrene was purchased from Gulf Oil Chemical and El Paso Products, Texas and purged with a stream of nitrogen.

The copolymer composition and percent polybutadiene micro-structure were obtained from $13_{C\ NMR}$ (Nuclear Magnetic Resonance). High performance gel permeation chromatograms (HPGPC) were obtained using a Waters 150 C Gel Permeation Chromatograph. Polymer solutions at 0.25 wt. % in THF (tetrahydrofuran) were injected onto columns at a flow rate of 1 ml/minute. The instrument oven and the differential refractometer were at 30° C. The column set used was duPont bimodal S (PSM 1000S/PSM 60S, 6.2 mm×25 cm).

TREAD VULCANIZATE PROPERTIES

There were determined as follows:

Loss Tangent Delta: Tanδ was measured by means of an instrumented Yerzley Oscillograph (IYO) at room temperature and 5 Hertz. The Yerzley Oscillograph is a good predictor of twin-roll rolling resistance of tire tread material formulations. The lower the tanδ value, the lower the rolling resistance.

Wet-Skid Coefficient of Friction: An instrumented British Portable Skid Tester (IPST) was used to measure the wet coefficient of friction (μ-wet) on a smooth concrete surface. All wet-skid coefficient values are relative to a normalized standard μ-wet value of 0.600 for a 65/35 E-SBR/cis-BR carbon black filled tread vulcanizate formulation. The test shows good correlation of u-wet with wet tire traction data (peak wet traction at 96.6 km/hour). The higher the μ-wet, the better the traction performance on a wet concrete road. E-SBR: Emulsion styrene butadiene copolymer rubber, Ca. 23.5% styrene. cis-BR approximately 93% Cis-1,4.

Pico Abrasion Index:

This test was run as described in ASTM D2228.

EXAMPLE 1

Preparation of Soluble Polyfunctional Initiator 348.7 grams of secondary-butyllithium (s-BuLi) in solution in cyclohexane was charged by syringe to a clean, dry, oven-baked three-neck flask equipped with stirrer to give 232.23 mmoles s-BuLi. The butyllithium was purchased as a solution and previously analyzed for carbon-lithium content. The solution was cooled by immersing the bottom half of the flask into an ice-water bath. 100.03 grams of triethylamine (TEA) which had been previously distilled from s-BuLi was added over ½ hour to the stirring flask contents to give 988.54 mmoles TEA and 4.26 (TEA)/(s-BuLi). At no time during addition of TEA did the reactant's temperature reach 5° C. The s-BuLi solution darkened from yellow to orange with the addition of TEA.

81.03 ml (71.78 grams) of divinylbenzene (DVB)# solution in toluene was added dropwise over 4 hours and 50 minutes to the rapidly stirring s-BuLi/TEA solution which was kept between 0° C. and +5° C. maximum. Upon the addition of the first drops of DVB solution, a red color was observed which deepened in intensity to very deep red. An argon atmosphere was maintained at all times. The flask was packed in ice to allow gradual warming overnight. The final polyfunctional initiator was a deep red solution containing no visually observed insoluble phase which would have been obvious during subsequent transfer through transfer needle into dry argon-purged bottles.

The 81.03 ml of divinylbenzene solution contained 193.52 mmoles divinylbenzene and 68.95 mmoles ethyl vinyl benzene based on NMR analysis of the DVB distillate and weights of materials used in dilution. The amount of divinyl benzene was calculated as divinylbenzene with no inclusion of ethyl vinyl benzene. The final molar ratio of s-BuLi/DVB was 6/5, which gives an expected Li functionality of 5. The measured carbonlithium functionality of this initiator based on $\overline{M}n$ in grams/mole times carbon-lithium content in moles of C-Li/gram of initiator was found to be 4.71.

The addition product of divinylbenzene (and of ethylvinylbenzene, if present) and secondary-butyllithium is referred to as the adduct or initiator.

Foster Grant Company, Inc.—general sample—The DVB was vacuum distilled at 47°-49° C. and 0.8 mm pressure from dibutylmagnesium and the main cut divided. A small amount of the distillate was retained for analysis in toluene by NMR which gave the following results: 73.4% DVB (all isomers), 26.5% EVB.

EXAMPLE 2

Preparation of Medium Vinyl Solution
Styrene-Butadiene Star Rubbery Copolymer

TITRATION PROCEDURE 413.5 grams 5A sieve-dried cyclohexane and 14.94 grams triethylamine were charged to a clean, dry quart polymerization bottle. The polyfunctional initiator solution described in Example 1 above was added to the bottle dropwise by syringe until a pale orange color remained when the bottle surface was washed with the solution. 0.69 gram of initiator (0.489 mmole carbonlithium/gram solution) gave a titration level of 0.34 mmole carbon-lithium.

POLYMERIZATION PROCEDURE

Two quart bottle polymerizations were used to prepare the medium vinyl SBRs. The following ingredients were charged to the bottles respectively: 415.6 grams and 410.6 grams cyclohexane; 12.60 g and 12.81 g triethylamine; 14.96 g and 14.99 g styrene; 48.7 g and 48.8 g butadiene. The monomers were added at the same time. To each bottle was added approximately 0.7 ml of the polyfunctional initiator to react with impurities in the system followed by the remainder of initiator. 1.98 g and 1.91 g respectively were added to give 0.968 mmole and 0.915 mmole of carbon-lithium respectively. The 0.34 mmole assumed for titration left 0.628 mmoles and 0.575 mmoles respectively, of carbon-lithium assumed active for polymerization.

The polymerizations were accomplished overnight at 50° C. in a rotating bath. Essentially complete conversion to copolymers was obtained. Viscous, slightly turbid orange solutions resulted. The solutions were terminated by addition of antioxidant solution. The SBR copolymers were precipitated, 1 wt. % antioxidant was incorporated, and the copolymers were dried in vacuo. The SBR copolymers each had a star-shape with an average of 4.71 arms each. The copolymers were blended on the mill to give a white elastomeric material.

EXAMPLE 3

The properties of a commercial solution polymerized butadiene-styrene copolymer (tin coupled) versus the star-shaped solution SBR of this invention having essentially the same styrene content and polybutadiene microstructure have been compared, but with polymer arms connected with carbon-carbon rather than carbon-Sn bonds.

The polymers were compounded as 50/50 by weight mill-mixed blends with NR according to the formula in Table I and cured to provide shore A hardness values of 64±1.

TABLE I

| Compound Formulation | |  |
|---|---|---|
| Material | Parts by Weight | |
| Natural Rubber | 50. | |
| Solution SBR | 50. | |
| N-339 Carbon Black | 45. | |
| "Circosol" 4240/42XH Oil | 10. | Commericial Solution SBR |
|  | 20. | Present Solution SBR |
| Zinc Oxide | 3.0 | |
| Stearic Acid | 2.5 | |
| Antioxidant | 1.2 | |
| N-tert-butyl-2 benzothiazole sulfenamide | 1.52 | |
| Sulfur | 2.18 | |

The polymer structure data and tread vulcanizate properties are given in Table II, below. The results demonstrate that the tread compound containing the medium vinyl star-shaped SBR of this invention provides nearly the same balance of Yerzley loss tangent delta, Pico abrasion index and wet coefficient of friction as the commercial solution SBR, when tested in blends with NR.

TABLE II

| Comparison of Properties | | | | | | | | | |
|---|---|---|---|---|---|---|---|---|---|
| | Solution Polymers Characterization | | | | | Vulcanizate Blend Characterics | | | |
| | Characterization | | | | Glass | | Tensile | | | | |
| Sample No. | % Sty | % Vinyl | % Trans | % Cis | Transition °C. Temperature # | Wt % MVSBR | Strength (MPa) | Tanδ IYO | μ-wet IPST | PICO Index |
| STAR-MVSBR (1) | 23.5 | 26 | 45 | 29 | −71 | 50 | 18.0 | .179 | .555 | 96 |
| Commericial Solution SBR (2) | 23.5 | 31 | 42 | 27 | −56 | 50 | 18.7 | .182 | .581 | 97 |

(1)-star-shaped SBR prepared with polyfunctional initiator as disclosed herein.
(2)-Sn-coupled SBR.
-Tg By differential scanning calorimetry As shown in the drawing which is illustrative of a pneumatic tire, especially a radial passenger tire, the tire comprises a compounded carbon black reinforced sulfur vulcanized composition tread portion 1 in which all of the rubber of the tread can comprise the blend or mixtures of the present invention. The tire also contains sidewalls 2, white sidewalls 3, beads 4 and belts 5.

We claim:

1. A tire having a tread of a compounded carbon black reinforced and vulcanized composition of a blend of (A) from about 40 to 60% by weight of a solution polymerized rubbery substantially random star-shaped polymer and (B) from 60 to 40% by weight of at least one rubbery polymer selected from the group consisting of natural rubber, synthetic cis-1,4-polyisoprene rubber, cis-1,4-polybutadiene rubber, high trans-1,4-polybutadiene rubber and high trans-1,4-butadiene-styrene rubbery copolymer, (A) being at least one polymer selected from the group consisting of polybutadienes, polyisoprenes, butadiene-styrene copolymers, butadiene-isoprene copolymers, isoprene-styrene copolymers, butadiene-isoprene-styrene copolymers and mixtures of the same, said styrene containing copolymers containing up to about 30 weight % of styrene, preferably from about 10 to 25 weight % of styrene, having a vinyl content for the diene segments of from about 12 to 60 weight %, having an average of from about 4 to 9 arms, having a $\overline{Mn}$ of from about 100,000 to 500,000, and having a nucleus from an initiator (1) having a VPO $\overline{Mn}$ of from about 750 to 4,000, (2) having an average of from about 4 to 9 C-Li sites and (3) being the adduct of an aromatic compound selected from the group consisting of divinyl benzene and diisopropenyl benzene and mixtures thereof and RLi where R is selected from the group consisting of normal, secondary and tertiary alkyl and cycloalkyl radicals of from 2 to 20, or from 2 to 10, carbon atoms, the mold ratio of RLi to said aromatic compound being about 1:0.83.

2. A tire according to claim 1 where (A) is a butadiene-styrene copolymer and (B) is natural rubber.

3. A vulcanizable composition comprising a blend of (A) from about 40 to 60% by weight of a solution polymerized rubbery substantially random star-shaped polymer and (B) from 60 to 40% by weight of at least one rubbery polymer selected from the group consisting of natural rubber, synthetic cis-1,4-polyisoprene rubber, cis-1,4-polybutadiene rubber, high trans-1,4-polybutadiene rubber and high trans-1,4-butadiene-styrene rubbery copolymer, (A) being at least one polymer selected from the group consisting of polybutadienes, polyisoprenes, butadiene-styrene copolymers, butadiene-isoprene copolymers, isoprene-styrene copolymers, butadiene-isoprene-styrene copolymers and mixtures of the same, said styrene containing copolymers containing up to about 30 weight % of styrene, preferably from about 10 to 25 weight % of styrene, having a vinyl content for the diene segments of from about 12 to 60 weight %, having an average of from about 4 to 9 arms, having a $\overline{Mn}$ of from about 100,000 to 500,000, and having a nucleus from an initiator (1) having a VPO $\overline{Mn}$ of from about 750 to 4,000, (2) having an average of from about 4 to 9 C-Li sites and (3) being the adduct of an aromatic compound selected from the group consisting of divinyl benzene and diisopropenyl benzene and mixtures thereof and RLi where R is selected from the group consisting of normal, secondary and tertiary alkyl and cycloalkyl radicals of from 2 to 20, or from 2 to 10, carbon atoms, the mold ratio of RLi to said aromatic compound being about 1:0.83.

4. A composition according to claim 3 where (A) is a butadiene-styrene copolymer and (B) is natural rubber.

5. A vulcanized compounded carbon black reinforced blend of (A) from about 40 to 60% by weight of a solution polymerized rubbery substantially random star-shaped polymer and (B) from 60 to 40% by weight of at least one rubbery polymer selected from the group consisting of natural rubber, synthetic cis-1,4-polyisoprene rubber, cis-1,4-polybutadiene rubber, high trans-1,4-polybutadiene rubber and high trans-1,4-butadiene-styrene rubbery copolymer, (A) being at least one polymer selected from the group consisting of polybutadienes, polyisoprenes, butadiene-styrene copolymers, butadiene-isoprene copolymers, isoprene-styrene copolymers, butadiene-isoprene-styrene copolymers and mixtures of the same, said styrene containing copolymers containing up to about 30 weight % of styrene, preferably from about 10 to 25 weight % of styrene, having a vinyl content for the diene segments of from about 12 to 60 weight %, having an average of from about 4 to 9 arms, having a $\overline{M}n$ of from about 100,000 to 500,000, and having a nucleus from an initiator (1) having a VPO $\overline{M}n$ of from about 750 to 4,000, (2) having an average of from about 4 to 9 C-Li sites and (3) being the adduct of an aromatic compound selected from the group consisting of divinyl benzene and diisopropenyl benzene and mixtures thereof and RLi where R is selected from the group consisting of normal, secondary and tertiary alkyl and cycloalkyl radicals of from 2 to 20, or from 2 to 10, carbon atoms, the mold ratio of RLi to said aromatic compound being about 1:0.83.

6. A blend according to claim 5 where (A) is a butadiene-styrene copolymer and (B) is natural rubber.

* * * * *